J. W. Dixon.
Pulp Digester
N° 54,308.   Patented May 1, 1866.

Witnesses.
L. S. Durfee
Geo. Buckley

Inventor.
John W. Dixon

UNITED STATES PATENT OFFICE.

JOHN W. DIXON, OF PHILADELPHIA, PENNSYLVANIA.

IMPROVEMENT IN THE MANUFACTURE OF PAPER-PULP.

Specification forming part of Letters Patent No. 54,308, dated May 1, 1866.

*To all whom it may concern:*

Be it known that I, JOHN W. DIXON, of the city of Philadelphia and State of Pennsylvania, have invented a new and useful Improvement in Apparatus for Making Pulp from Wood, Straw, and other Vegetable Fibrous Material; and I do hereby declare the following to be a full and exact description of the same, reference being had to the annexed drawings, making a part of the same, in which—

Figure 1:
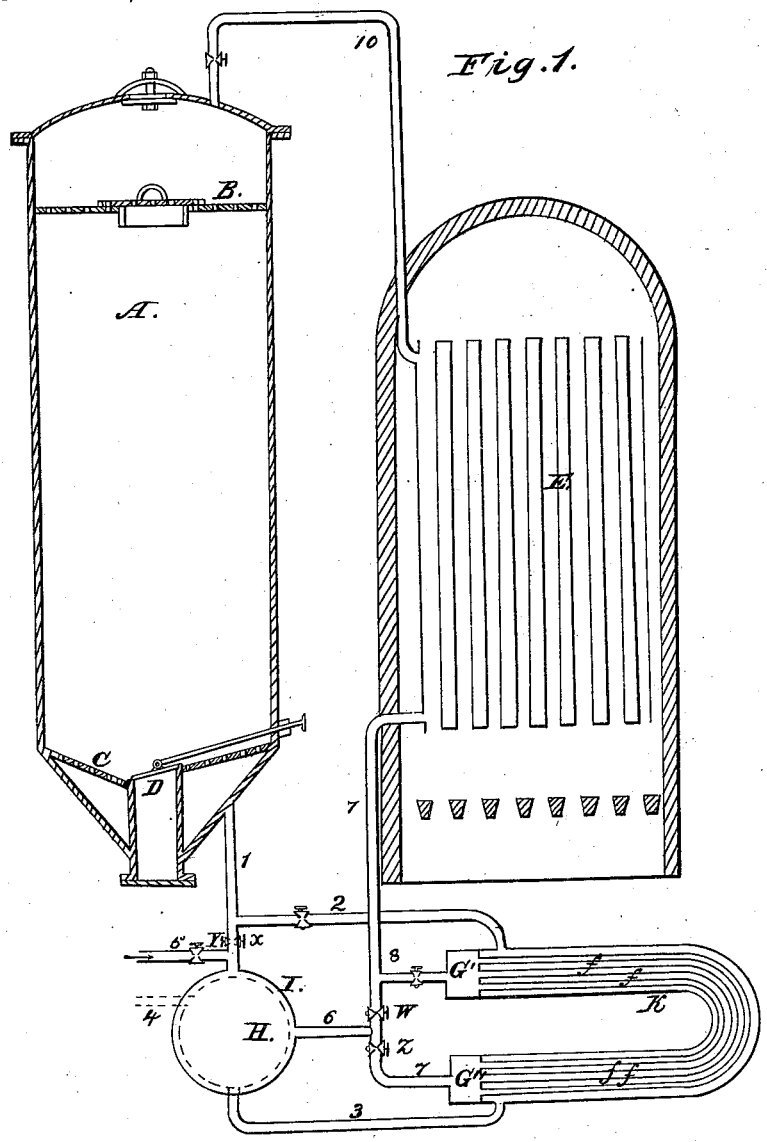
Figure 2:
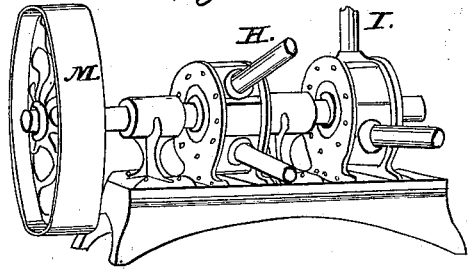

Figure 1 is a vertical section through the apparatus, and Fig. 2 is a perspective view of the pump and water-motor forming a part thereof.

A, Fig. 1, is a vertical digester, made very strong and having a close-fitting cover, with upper and lower perforated diaphragms, B and C, and lower discharge pulp passage and valve, D, being intended to digest wood and other vegetable fibrous material with highly-heated water under very high pressure, in the manner described in a former patent granted to me.

E represents a vertical tubular heater in a furnace.

K is a water-heating apparatus similar to a condenser, composed of a strong cast-iron shell or tube about one foot in diameter and fifty feet long, for convenience bent into the shape of a U, and filled up with a series of small tubes, $fff$, one or two inches in diameter, communicating with a water-space, G′ and G″, at each extremity.

H and I, Fig. 2, represent perspective views of a rotary motor and a rotary pump on the same axle. The position which they occupy in the combined apparatus is shown at H and I, Fig 1.

The bottom of the digester A, the pump and water-motor, the heating water apparatus K, and the vertical tubular heater and the interior of the top of the digester are so connected together as to establish a complete circulation, as follows: The heated water under pressure, which has percolated through the wood or material being pulped and filled with gluten, passes through the lower diaphragm, C, and the tube 1 and the tube 2 into the interior of K, surrounding the small tubes $fff$, and finally passes out through the tube 3 into the interior of a rotary water-motor, or a water-pressure engine, H, and by reason of the pressure in the digester causes the water-motor to move, and, finally, this water, having turned the water-motor, escapes at 4.

On the same axle with the water-motor H is a rotary pump, I, and the force given out by the refuse water passing out through the water-motor causes this pump to revolve. Fresh water enters into the body of this pump at 5, and is forced out through 6 and 7 into the passage G′, where it passes through the interior of the tubes $fff$ into G′, and thence through 8 and 9 into the bottom of the heater E thence through the heater E, and by means of the tube 10 into the top of the digester. Thus it will be seen that the refuse heated water under pressure escaping from the bottom of the digester A is made to impart its heat while passing through the pipe K to the entering fresh cold water contained within the tubes $fff$, and the escaping refuse water drives a water-motor, and thus propels a pump, which forces in the fresh water, which having been heated while passing through K, as just described, passes on through the tubular boiler E, where it receives additional heat before it finally passes into the top of the digester A.

Inasmuch as the escaping water could not force in an amount of fresh water equal to the refuse water which escapes, I place a pulley, M, on the common shaft of the pump and water-motor, and attach this by a belt to some auxiliary source of power, which auxiliary power co-operates with the water-motor in driving the pump, and supplies the power which would have been otherwise consumed by friction, &c. Thus a large percentage of the heat and force of the escaping water are utilized in heating and forcing in fresh water to the digester.

By opening the cock $x$ and closing the cock $y$, and opening the cock $w$ and closing the cock $z$, and closing all the other cocks, the water from the bottom of $a$ will pass direct into the pump through 1, and thence be forced through 6 and 9 into the heater E and the top of the digester. In such case a short circulation is established at first by the auxiliary power working the pump until the water reaches its maximum heat and pressure and becomes charged with gluten. The cocks are then reversed and the refuse liquor is permitted to escape, as first above described, and force in fresh water to replace itself in the digester A, and thus a continuous washing and digesting of the wood or other matter will take place in A in successive portions of fresh water under pressure.

Instead of a vertical tubular boiler, as E, a coil of heavy pipe, as shown in a former patent of mine, might be used with great advantage on account of its superiority in displacing the contents of the boiler.

Instead of a rotary water-motor and rotary pump being on the same shaft, they may be connected by a belt, or cog-gearing may be substituted, and any convenient form of heating the incoming fresh water by the escaping hot water may be substituted for K.

Having thus described my improvement, what I claim as my invention, and desire to secure by Letters Patent, is—

1. The combination of the wood and straw pulp digester, the water-motor, and the force-pump, whereby the escaping water under pressure forces fresh water in at the top.

2. The combination of the digester A, the water-motor, the pump, and the heater at K, whereby the escaping water both heats and forces in the fresh water.

3. The combination of the digester A, the water-motor and pump, the heater K, and the heater E, whereby the escaping water forces in fresh water, which absorbs the heat from the escaping water and is further heated before it enters the top of the digester.

JOHN W. DIXON.

Witnesses:
  J. E. SHAW,
  GEORGE BUCKLEY.